Figure 9:
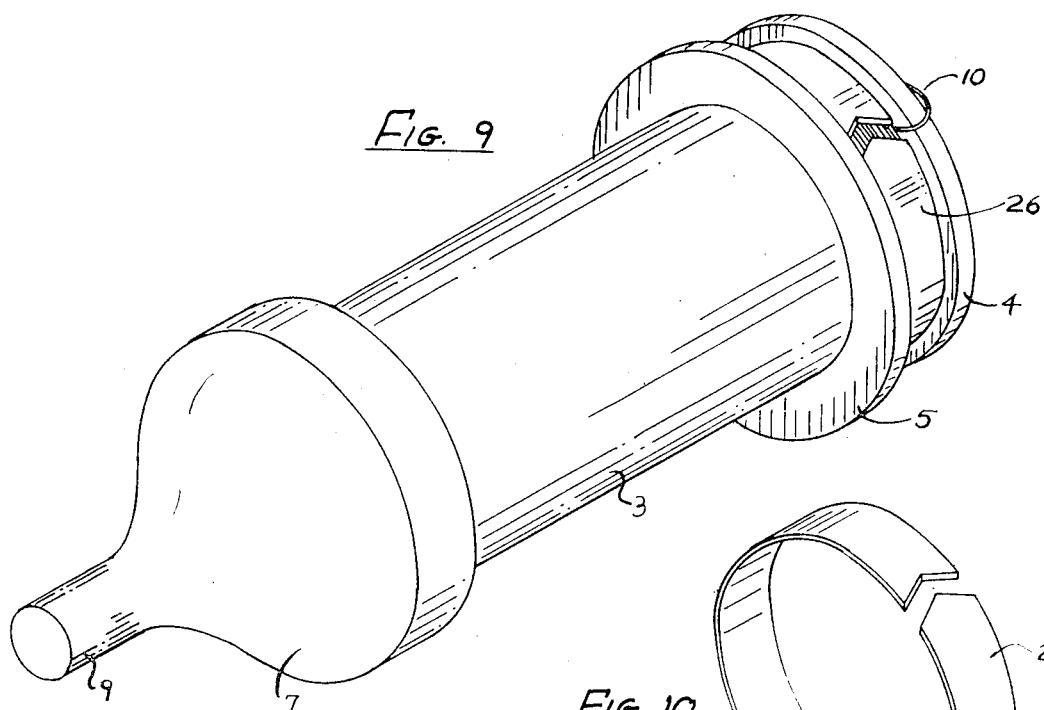

United States Patent

Zenick

[15] 3,641,695

[45] Feb. 15, 1972

[54] DEVICE FOR CASTING A FISHING LINE

[72] Inventor: Raymond G. Zenick, 912 Briarwood Lane, Glendale, Calif. 91206

[22] Filed: Aug. 25, 1969

[21] Appl. No.: 852,748

[52] U.S. Cl. ................................................43/19, 242/84.2 J
[51] Int. Cl. ........................................................A01k 91/02
[58] Field of Search............... 242/84.2, 84.2 J, 84.2 C, 85.1, 242/96; 43/19; 124/22, 21, 17; 273/96

[56] References Cited

UNITED STATES PATENTS

| 394,996 | 12/1888 | Pratt | 242/125.3 |
| 2,735,417 | 2/1956 | Denekar | 124/20 |
| 2,808,043 | 10/1957 | Lombard | 43/19 |
| 2,948,078 | 8/1960 | Miotke | 43/19 |
| 3,208,586 | 9/1965 | Wilson | 242/85.1 X |

FOREIGN PATENTS OR APPLICATIONS

| 1,034,519 | 4/1953 | France | 124/17 |
| 776,927 | 6/1957 | Great Britain | 242/125.2 |

Primary Examiner—Billy S. Taylor
Attorney—Larry N. Barger

[57] ABSTRACT

A device for casting a fishing line that includes a cylindrical spool and handle unit with a longitudinal passage therethrough and an elastic balloon anchored to this unit. A fishing line wound on the spool is stripped from the spool when the elastic balloon containing a weighted end of the fishing line is stretched and released, hurling this weighted end out through the passage on the unit.

30 Claims, 14 Drawing Figures

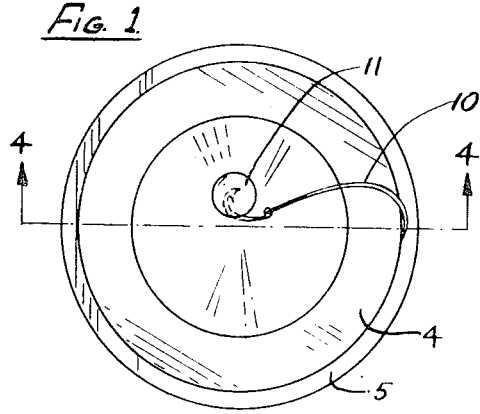
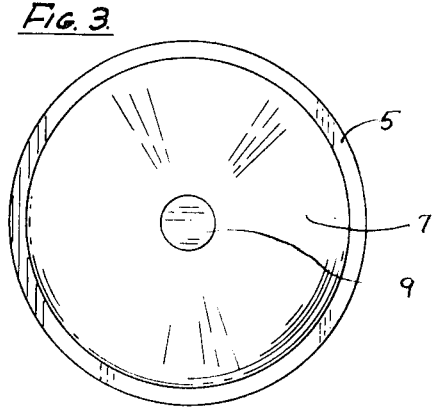
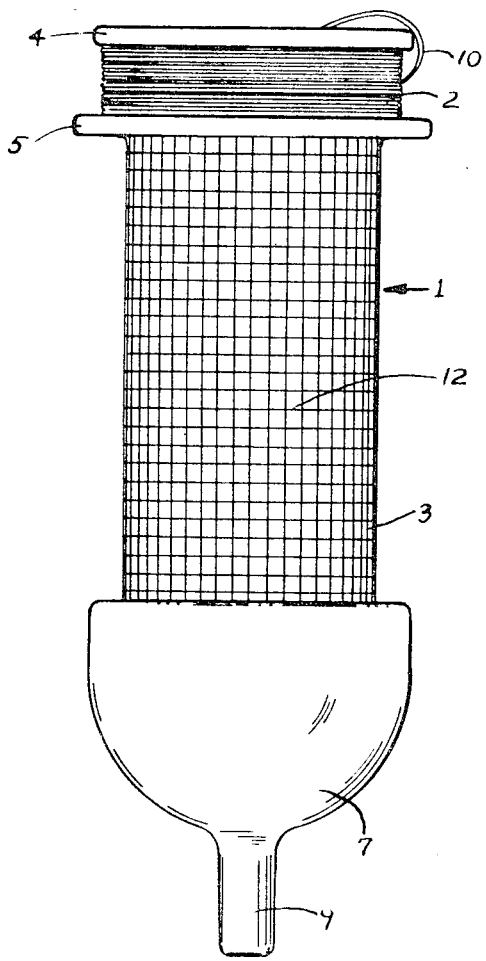
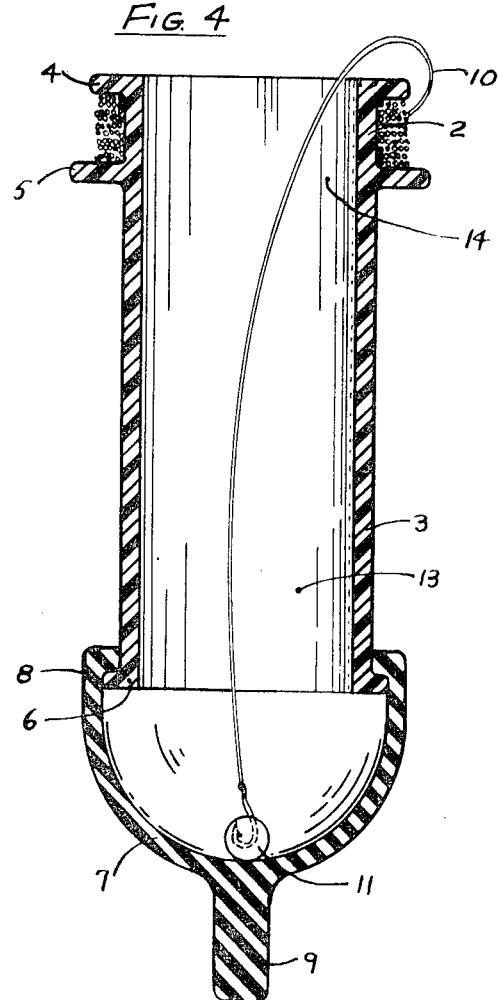

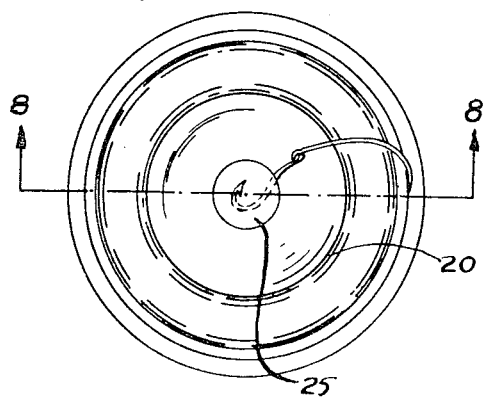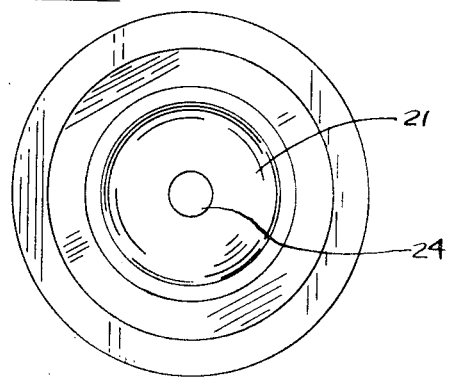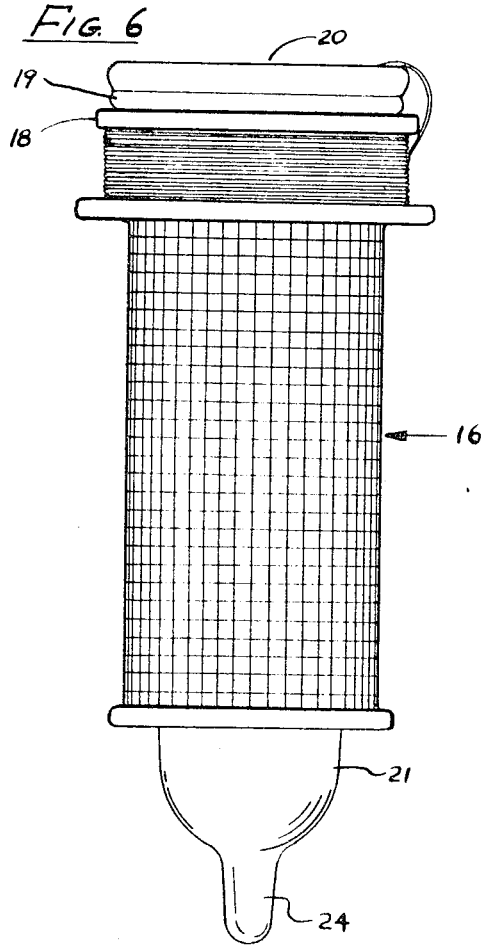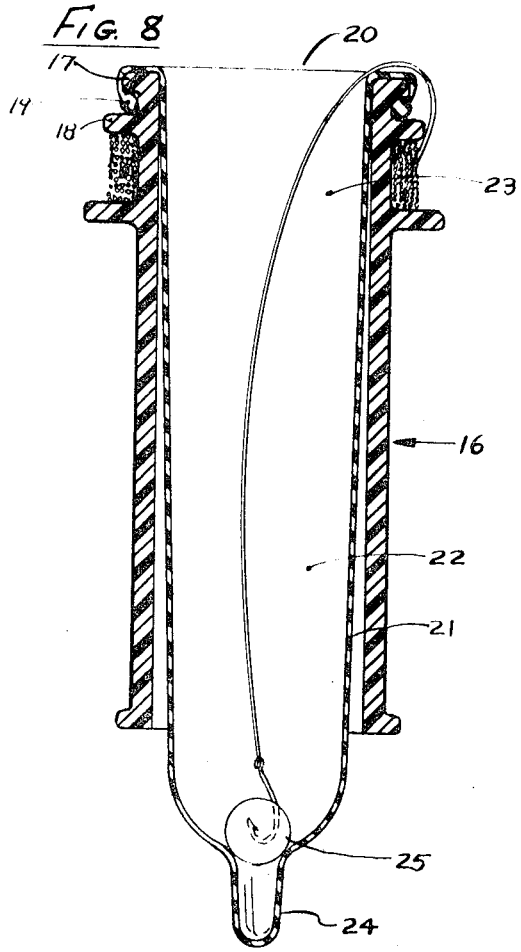

INVENTOR.
RAYMOND G. ZENICK
BY
Larry N. Barger
ATTORNEY

INVENTOR.
RAYMOND G. ZENICK
BY
Larry N. Barger
ATTORNEY

DEVICE FOR CASTING A FISHING LINE

This invention relates to a device adapted to cast a fishing line to a desired location in a lake, stream or the like. The device has an elastic balloon anchored to a manipulatable unit that includes a spool for the fishing line and a handle. By holding the handle in one hand and then stretching and releasing the elastic balloon, a person can cause the fishing line to uncoil from the spool and be cast out to the desired location.

The conventional way to cast out a fishing line is with a long casting rod of 4 to 8 feet in length with a reel attached to the rod. The rod is swung through an arc to build up centrifugal force at the forward tip of the rod. At the precise moment the reel is released causing the weighted fishing line to strip off the reel and be cast out through the forward tip of the rod.

As anyone knows who has gone fishing, this "rod and reel" method has certain disadvantages. First, the long rod of 4 to 8 feet was troublesome to store and transport. Secondly, the long rod often got caught in trees, brush, and other foliage surrounding lakes and streams. Also, many fishermen have been slapped, poked, and hit with the fishing rod of another fisherman, particularly when in the close confines of a boat. Finally, it takes a certain amount of expertise to operate a rod and reel because the forward tip of the rod, which controls the direction and distance in which the line is cast, is spaced several feet from the handle where the rod is grasped.

It has been proposed to eliminate the long casting rod and have a hand-held spool that operates like a spinning reel. The idea here is to take a portion of a weighted line and swing it in a circle to build up centrifugal force and then let go of the line at the proper time so the line is flung out into the river or stream. This method of casting a fishing line closely resembles tossing a "lariat" rope, and as with the "rod and reel" method requires a great deal of skill. Also, when swinging the weighted fishing line in a circle, a large open space is required or it is likely that the line will get caught in the surrounding foliage.

I have overcome the disadvantages of the long rod of the "rod and reel" devices and also the large open spaces required by the "lariat"-type casting devices. Also, my invention requires much less skill to operate than either of the two previously mentioned devices for casting a fishing line. People who have avoided fishing because they did not know how to use a rod and reel can readily master the casting device of my invention.

The device of my invention has a manipulatable unit comprising a spool for the fishing line and joined to this spool is a handle that is held in one hand by the fisherman. There is an elastic means, such as a hollow tubular balloon with stretchable sidewalls anchored to the unit. By stretching and releasing the balloon with his other hand, the fisherman can hurl a weighted fishing line out through a common longitudinal passage in the handle and spool. The direction the line is cast is controlled by pointing the manipulatable unit in this particular direction. The distance the line travels in this direction is controlled by how far the elastic balloon is stretched before it is released.

Figure 10:
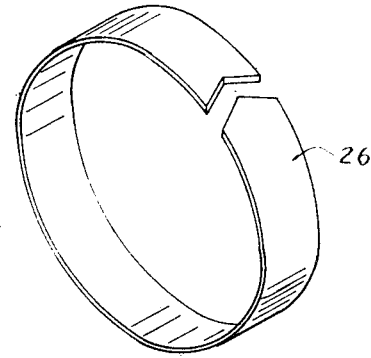
Figure 11:
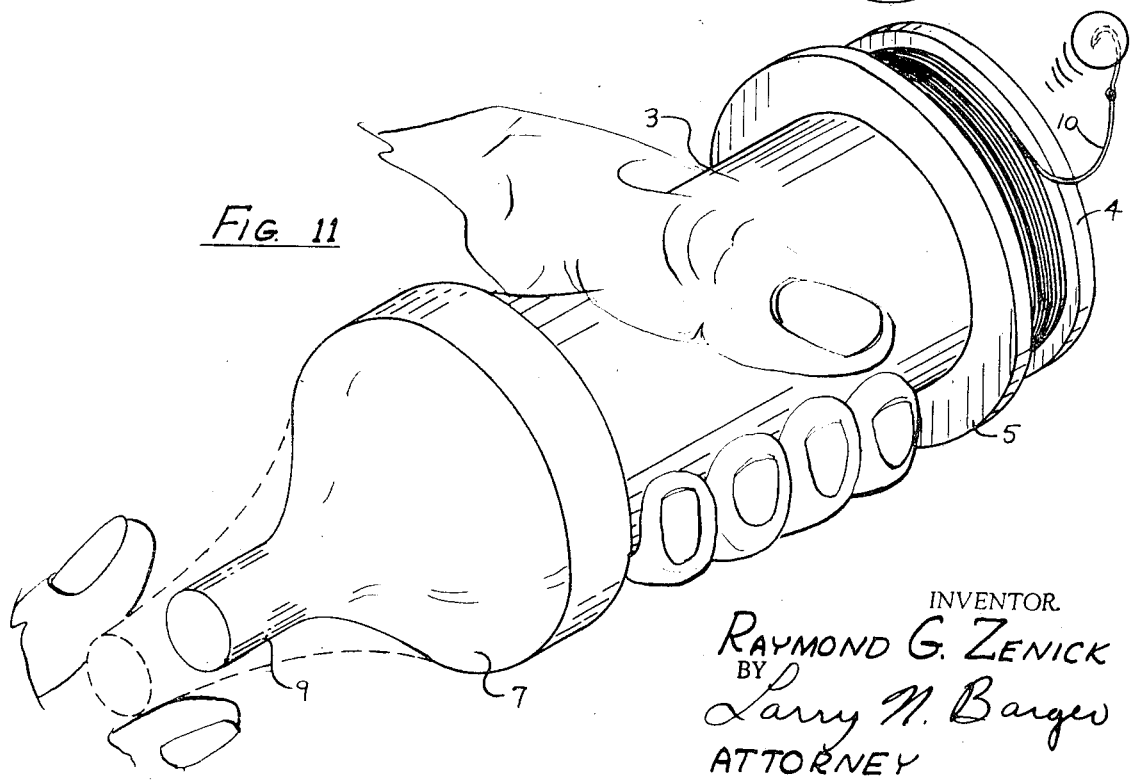
Figure 12:
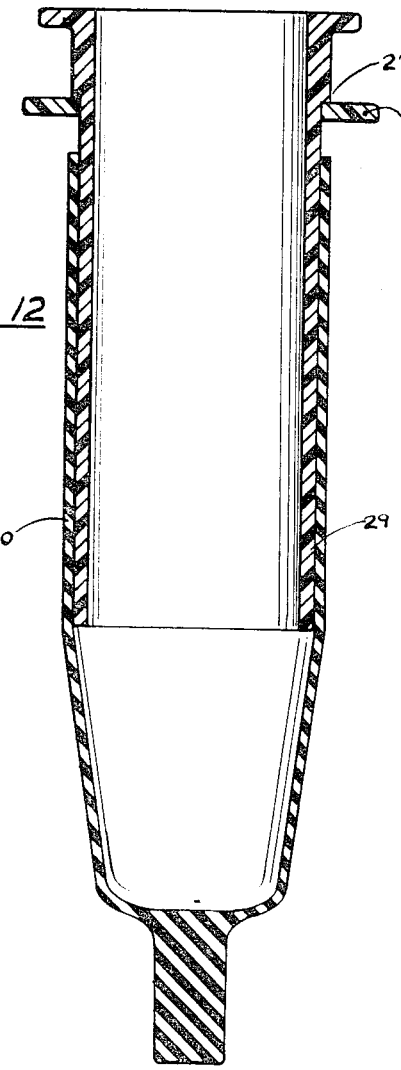
Figure 13:
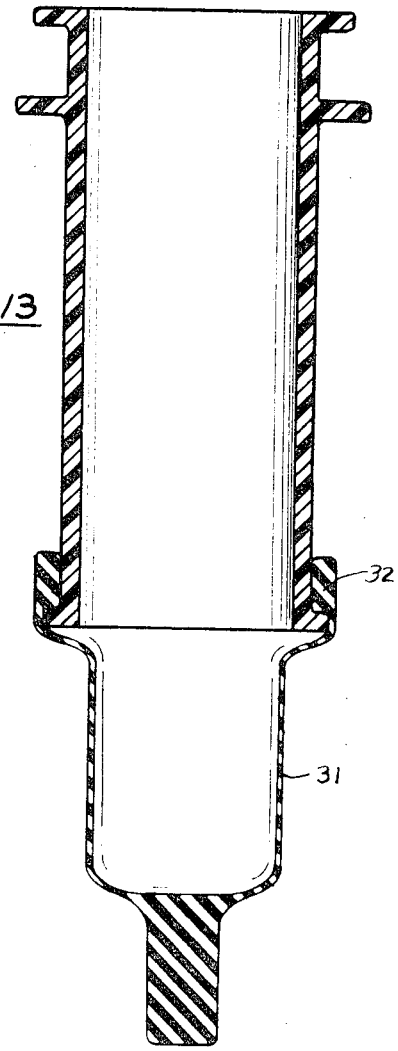
Figure 14:
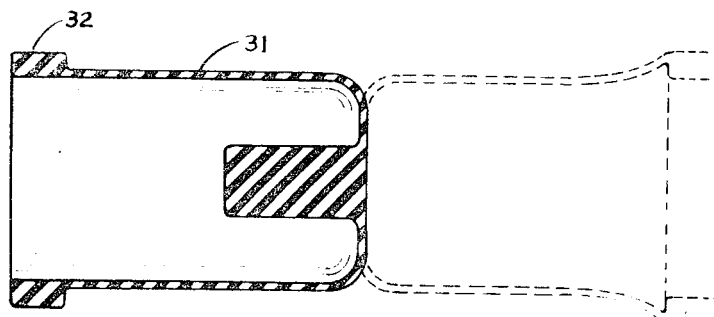

Perhaps this invention can be better understood with reference to the drawings, in which:

FIG. 1 is a top plan view of a first embodiment of my invention;
FIG. 2 is a side elevational view of FIG. 1;
FIG. 3 is a bottom plan view of FIG. 2;
FIG. 4 is a sectional view taken along line 4—4 of FIG. 1;
FIG. 5 is a top plan view of a second embodiment of my invention;
FIG. 6 is a side elevational view of FIG. 5;
FIG. 7 is a bottom plan view of FIG. 6;
FIG. 8 is a sectional view taken along line 8—8 of FIG. 5;
FIG. 9 is a perspective view of the first embodiment of my invention showing fishing line retained on its spool;
FIG. 10 is a perspective view of a retaining band to hold fishing line on the spool;
FIG. 11 is a perspective view of the first embodiment of my invention showing the elastic means being pulled and released to cast out the fishing line;
FIG. 12 is a sectional view of a third embodiment of the invention similar to FIG. 4 prior to coiling fishing line on the spool;
FIG. 13 is a sectional view of a fourth embodiment similar to FIG. 4 prior to coiling fishing line on the spool, and showing a slightly different configuration of the cup-shaped balloon; and
FIG. 14 is a sectional view of the cup-shaped balloon of FIG. 13 showing the shape in which it is molded.

Referring in detail to these drawings, FIGS. 1–4 shows a first embodiment of my invention. Here, the device for casting a fishing line includes a manipulatable unit 1 with a spool 2 and a handle 3 connected to the spool at the handle's upper end. The spool 2 has a pair of longitudinally spaced external flanges 4 and 5 to retain a fishing line when wound on the spool. At a lower end of the handle 3 is an external balloon retaining flange 6 which also helps to keep the manipulatable unit from sliding out of a person's hand when grasped by handle 3.

As best shown in FIG. 4, an elastic hollow tubular balloon 7 is anchored to the balloon retaining flange 6 by means of an internal groove structure 8 connected to stretchable sidewalls of the balloon. In this figure, the balloon is shown as cup-shaped with a pull tab 9 integral with the balloon.

Preferably, pull tab 9 has a solid cross section so that a hook or bait will not enter the pull tab and be squeezed between a thumb and forefinger when using the device. Shallow balloons such as shown in FIG. 4 can be compression molded to provide a solid pull tab 9.

When the device is used to cast out a fishing line, a fishing line 10 is wound on spool 2 between flanges 4 and 5. One end of the line has a weight means, designated as 11, attached thereto. This weight means is shown as a bait covered hook, but could be a lure, lead weight, etc. To use the device of FIG. 4, a fisherman grasps the handle between flanges 5 and 6 and the external surface is preferably roughened by ribs or grooves shown at 12 to provide him with a firm grip. He then aims the device in the direction he wants to cast the line. Next, he pulls back on tab 9 and releases it. The balloon 7 being elastic snaps back to its original dimension and hurls the weighted line 10 out of the internal interconnecting passages 13 and 14 of the handle and spool, which passages lie along the common longitudinal axis of the manipulatable unit. To reel in the line the fisherman simply winds the line around the spool.

Turning now to the second embodiment of my invention shown in FIGS. 5–8, a device is shown that casts a fishing line in essentially the same manner as the first embodiment. However, here the structure of the manipulatable unit and the elastic balloon are different. The manipulatable unit 16 has an external balloon retaining flange 17 at the spool end of the unit. Flange 17 and flange 18 form a groove structure therebetween to confine a bead 19 at a mouth 20 of an elongated tubular balloon 21 with stretchable sidewalls. As shown best in FIG. 8, the balloon 21 extends completely through the interconnecting passages 22 and 23 of the handle and spool, and the balloon has a tab 24 that protrudes from a lower end of the unit. Tab 24 is shown as being hollow because long thin balloons are usually made by dipping a mandrel form into latex or plastisol, and this gives a uniform wall thickness to the balloon which is subsequently stripped from the mandrel. Even though tab 24 is hollow, it has a transverse internal dimension that is sufficiently smaller than weight means 25 to keep this weight means from entering into the pull tab.

FIG. 9 shows the device of FIGS. 1–4 in perspective view as it might be stored in a fishing tackle box. Fishing line is wound on the spool and is held on the spool by a thermoplastic or metal C-shaped band 26 that can expand and snap onto the spool between its flanges 4 and 5. This keeps the fishing line from unwinding prior to using the device. In FIG. 10, the C-shaped band 26 is shown after it has been removed from the unit. Finally, in FIG. 11, the device is shown as being aimed with the balloon stretched and then released to hurl out the weighted fishing line to the desired location in the lake, river or stream.

A third embodiment of my invention is shown in FIG. 12. Here, the manipulatable unit is molded in two pieces to make the molding process simpler, because a cam-actuated mold is not needed. As shown in FIG. 12, the manipulatable unit has a shoulder 27 at the lower edge of its spool. Thus, a lower flange 28 can be separately molded and telescoped over the handle from a bottom end of the handle 29 and secured in place against shoulder 27 either by friction, adhesive or a fusion joint to provide proper spacing between the flanges of the spool. Over a major portion of the handle's outer surface is stretched a cup-shaped balloon 30, which balloon can be conveniently formed by blow molding. The balloon 30 can be held firmly on the handle by friction between the balloon and handle which is greatly increased when the fisherman grasps the outside of the balloon-covered handle when he uses the device to cast a fishing line.

FIG. 13 shows a fourth embodiment of the device with a slightly modified cup-shaped balloon which is more elongated than the cup-shaped balloon of FIG. 4. The balloon 31 here is conveniently compression molded without undercuts, as shown in solid line in FIG. 14. Then by everting the balloon it assumes the shape shown in dotted line and has an undercut internal lip 32 forming a groove structure that fits onto the handle's retention flange 33.

Preferably, the device shown in both the first and second embodiments has a specific gravity less than 1.0 so the device will float if accidentally dropped in water. I have found that the manipulatable unit can be economically molded as a one-piece unit from polypropylene thermoplastic material with an integrally joined spool and handle or it can be molded in two pieces, as shown in FIG. 12. Polypropylene, having a specific gravity of 0.91, is an excellent material for the unit as it is tough and durable and will float if dropped in water.

The balloons of the several embodiments can be of rubber, either natural or synthetic, but are preferably of a highly elastic thermoelastic material made by Shell Chemical Company, marketed under the name Kraton No. 2104, which can be blow molded and processed in machinery for plastics. Also, Kraton No. 2104 is sufficiently transparent so objects such as a weight or lure inside the balloon can be visibly detected.

In the foregoing specification, I have used specific examples to describe my invention. However, those persons skilled in the art will understand how to make certain modifications to the examples without departing from the spirit and scope of the invention.

I claim:

1. A device for casting a fishing line comprising: a manipulatable unit including a spool for receiving fishing line and handle connected to said spool; and an elastic cup-shaped balloon anchored to the unit and having stretchable sidewalls of a size and dimension to surround and physically confine a fishing lure or the like and provide directional guidance for the lure or the like when the balloon is longitudinally stretched and released.

2. A device for casting a fishing line as set forth in claim 1, wherein the device has a specific gravity less than 1.0, so said device will float if accidentally dropped in water.

3. A device for casting a fishing line as set forth in claim 1, wherein the spool and handle are both of thermoplastic material and are integrally joined, forming a one-piece manipulatable unit.

4. A device for casting a fishing line as set forth in claim 3, wherein the spool and handle are of polypropylene.

5. A device for casting a fishing line comprising: a hollow spool with a longitudinal passage therethrough; a length of fishing line wound on said spool; weight means attached to said fishing line; and an elastic cup-shaped balloon anchored to the device and having stretchable sidewalls of a size and dimension to surround and physically confine the weight means and provide directional guidance for the weight means when the balloon is longitudinally stretched and released.

6. A device for casting a fishing line as set forth in claim 5, wherein the device includes a hollow handle having a longitudinal passage communicating with the spool passage and the weight means is adapted to be hurled through both the handle and spool passages when casting out the fishing line.

7. A device for casting a fishing line as set forth in claim 5, wherein the spool includes a pair of spaced apart external flanges for confining the fishing line.

8. A device for casting a fishing line comprising: a hollow spool with a longitudinal passage therethrough; a length of fishing line wound on said spool; weight means attached to said fishing line; and a hollow tubular elastic balloon having a lip surrounding an open mouth at one end of the balloon, said lip of the balloon being anchored to the spool, which balloon is adapted to receive the weight means when fed into the spool passage and upon stretching and releasing the balloon the weight means can be hurled out of the spool passage to cast out the fishing line.

9. A device for casting a fishing line as set forth in claim 8, wherein the balloon lip has an annular bead thereon.

10. A device for casting a fishing line as set forth in claim 9, wherein the spool has an annular groove structure into which the balloon's annular bead is anchored.

11. A device for casting a fishing line as set forth in claim 8, wherein the elastic balloon is of rubber.

12. A device for casting a fishing line as set forth in claim 8, wherein the balloon has an integral pull tab at an end of the balloon opposite from its mouth.

13. A device for casting a fishing line as set forth in claim 12, wherein the pull tab is hollow but has a smaller internal transverse dimension than remaining portions of the balloon to keep the weight means from entering the pull tab.

14. A device for casting a fishing line comprising: a manipulatable unit including a spool for receiving fishing line and a handle connected to said spool, said unit having a passage extending through both the handle and spool along the unit's longitudinal axis; and an elastic cup-shaped balloon anchored to the unit and having stretchable sidewalls of a size and dimension to surround and physically confine a fishing lure or the like and provide directional guidance to the lure or the like when the balloon is longitudinally stretched and released.

15. A device for casting a fishing line as set forth in claim 14, wherein the handle has an upper end which is connected to said spool and has a lower end with a retention flange adjacent this lower end to which the elastic means is attached.

16. A device for casting a fishing line comprising: a manipulatable unit including a spool for receiving fishing line and a handle connected to said spool, said unit having a passage extending through both the handle and spool along the unit's longitudinal axis, said handle having an upper end which is connected to the spool and having a lower end with an external retention flange adjacent this lower end; and an elastic cup-shaped balloon with internal retaining means engaging said retention flange, whereby the elastic balloons can be stretched and released to provide a casting mechanism that operates through the longitudinal passage of the unit.

17. A device for casting a fishing line as set forth in claim 16, wherein the cup-shaped balloon is in an everted condition from its natural molded condition when so attached to the retention flange of the handle.

18. A device for casting a fishing line as set forth in claim 16, wherein the cup-shaped balloon has an integral pull tab.

19. A device for casting a fishing line as set forth in claim 18, wherein the pull tab has a solid cross section to prevent any weight means from entering said pull tab.

20. A device for casting a fishing line comprising: a manipulatable unit including a spool for receiving fishing line and a handle connected to said spool, said unit having a passage extending through both the handle and spool along the unit's longitudinal axis; an elastic cup-shaped balloon telescoped over a major portion of the handle's external surface, whereby additional frictional engagement between the balloon and the handle is provided when a fisherman grasps the balloon covered handle as he stretches and releases the balloon to provide a casting mechanism that operates through the longitudinal passage in the unit.

21. A device for casting a fishing line as set forth in claim 14, wherein the handle has an upper end to which the spool is connected, said unit having a retention flange adjacent the spool to which the elastic means is attached.

22. A device for casting a fishing line comprising: a manipulatable unit including a spool for receiving fishing line and a handle connected to said spool, said unit having a passage extending through both the handle and spool along the unit's longitudinal axis, said handle having an upper end to which the spool is connected, said unit having a retention flange adjacent the spool; and an elastic hollow tubular balloon fitting within the unit's passage, which balloon has a lip surrounding an open mouth at one end of the balloon, said lip of the balloon being held to the unit by said retention flange adjacent the spool.

23. A device for casting a fishing line as set forth in claim 22, wherein the balloon lip has an annular bead thereon.

24. A device for casting a fishing line as set forth in claim 22, wherein the balloon has an integral pull tab at an end opposite from its mouth.

25. A device for casting a fishing line as set forth in claim 14, wherein the spool includes a pair of spaced apart external flanges; and a length of fishing line is wound on the spool between these flanges.

26. A device for casting a fishing line as set forth in claim 25, wherein the unit has an external shoulder and one of the spool's flanges is separately formed and secured to the unit against said shoulder to provide proper spacing between the spool's flanges.

27. A device for casting a fishing line as set forth in claim 14, wherein the device has a specific gravity less than 1.0, so the device will float if accidentally dropped in water.

28. A device for casting a fishing line as set forth in claim 14, wherein the handle has a roughened external surface to provide firm gripping control when held in the palm of a hand.

29. A device for casting a fishing line as set forth in claim 14, wherein the cup-shaped balloon is sufficiently transparent in normal use so objects inside the balloon can be visually detected.

30. A device for casting a fishing line comprising: a hollow spool with a passage therethrough; a pair of spaced apart external flanges forming a portion of the spool; a handle with an upper end integrally joined to the spool and the handle also having a passage therethrough, the passages in the spool and handle having a common longitudinal axis; a length of fishing line wound on the spool between the flanges; weight means attached to said fishing line; a retention flange at a lower end of the handle; a cup-shaped hollow tubular elastic balloon having an internal retaining means engaging said external flange to hold said balloon to said handle; a pull tab on the balloon, which balloon is adapted to receive the weight means when fed through the interconnecting passages of the spool and handle, and upon stretching and releasing the elastic balloon the weight means can be hurled out of the interconnecting passages of the unit to cast out the fishing line.

* * * * *